(12) United States Patent
Di Luoffo et al.

(10) Patent No.: US 8,136,118 B2
(45) Date of Patent: *Mar. 13, 2012

(54) MAINTAINING APPLICATION OPERATIONS WITHIN A SUBOPTIMAL GRID ENVIRONMENT

(75) Inventors: Vincent Valentino Di Luoffo, Sandy Hook, CT (US); Craig Fellenstein, Brookfield, CT (US); Rick Allen Hamilton, II, Charlottesville, VA (US); Joshy Joseph, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/470,225

(22) Filed: May 21, 2009

(65) Prior Publication Data
US 2009/0228892 A1    Sep. 10, 2009

Related U.S. Application Data

(63) Continuation of application No. 10/757,282, filed on Jan. 14, 2004, now Pat. No. 7,552,437.

(51) Int. Cl.
*G06F 9/46* (2006.01)
(52) U.S. Cl. .................... 718/104; 718/102
(58) Field of Classification Search .............. 718/102, 718/104
See application file for complete search history.

(56) References Cited

U.S. PATENT DOCUMENTS

| | | |
|---|---|---|
| 4,096,561 A | 6/1978 | Trinchieri |
| 4,591,980 A | 5/1986 | Huberman et al. |
| 5,220,674 A | 6/1993 | Morgan |
| 5,325,525 A | 6/1994 | Shan et al. |
| 5,392,430 A | 2/1995 | Chen et al. |
| 5,416,840 A | 5/1995 | Cane et al. |
| 5,559,978 A | 9/1996 | Spilo |
| 5,630,156 A | 5/1997 | Privat et al. |

(Continued)

FOREIGN PATENT DOCUMENTS

CN    1336054    2/2002

(Continued)

OTHER PUBLICATIONS

Office Action, U.S. Appl. No. 12/211,243, filed Sep. 16, 2008, Di Luoffo et al, Mailed Aug. 12, 2009, p. 1-18.

(Continued)

*Primary Examiner* — Jennifer To
*Assistant Examiner* — Mengyao Zhe
(74) *Attorney, Agent, or Firm* — Mark C. Vallone; Amy J. Pattillo

(57) ABSTRACT

A system for maintaining application operations within a suboptimal grid environment includes a grid management system. The grid management system submits an application from among multiple applications to at least one resource node of a grid environment, wherein separate jobs each request at least one of the multiple applications. The grid management system monitors a performance status of the at least one resource node running the application according to a profile for the application. The grid management system compares the performance status with an operational requirement specified in the profile for when the application is operating at the at least one resource node. The grid management system, responsive to the performance status not meeting the operational requirement, adjusts the use by the application of resource nodes in the grid environment according to the profile, such that the application continues to operate when suboptimal conditions arise in the grid environment.

4 Claims, 6 Drawing Sheets

U.S. PATENT DOCUMENTS

| | | | |
|---|---|---|---|
| 5,640,569 A | 6/1997 | Miller et al. |
| 5,655,081 A | 8/1997 | Bonnell |
| 5,729,472 A | 3/1998 | Seiffert |
| 5,881,238 A | 3/1999 | Aman et al. |
| 5,884,046 A | 3/1999 | Antonov |
| 5,905,975 A | 5/1999 | Ausubel |
| 5,931,911 A | 8/1999 | Remy et al. |
| 5,960,176 A | 9/1999 | Kuroki et al. |
| 5,978,583 A | 11/1999 | Ekanadham |
| 5,996,013 A | 11/1999 | Delp et al. |
| 6,003,075 A | 12/1999 | Arendt et al. |
| 6,021,398 A | 2/2000 | Ausubel |
| 6,023,612 A | 2/2000 | Harris et al. |
| 6,038,560 A | 3/2000 | Wical |
| 6,049,828 A | 4/2000 | Deb |
| 6,064,810 A | 5/2000 | Raad et al. |
| 6,067,580 A | 5/2000 | Aman et al. |
| 6,119,186 A | 9/2000 | Watts et al. |
| 6,134,680 A | 10/2000 | Yeomans |
| 6,154,787 A | 11/2000 | Urevig et al. |
| 6,167,445 A | 12/2000 | Gai |
| 6,182,139 B1 | 1/2001 | Brendel |
| 6,304,892 B1 | 10/2001 | Bhoj et al. |
| 6,310,889 B1 | 10/2001 | Parsons et al. |
| 6,324,656 B1 | 11/2001 | Gleichauf |
| 6,356,909 B1 | 3/2002 | Spencer |
| 6,370,565 B1 | 4/2002 | Van Gong |
| 6,397,197 B1 | 5/2002 | Gindlesperger |
| 6,430,711 B1 | 7/2002 | Xu |
| 6,438,704 B1 | 8/2002 | Harris et al. |
| 6,452,692 B1 | 9/2002 | Yacoub |
| 6,453,376 B1 | 9/2002 | Fairman et al. |
| 6,463,454 B1 | 10/2002 | Lumelsky |
| 6,463,457 B1 | 10/2002 | Armentrout |
| 6,466,947 B2 | 10/2002 | Arnold et al. |
| 6,470,384 B1 | 10/2002 | O'Brien et al. |
| 6,480,955 B1 | 11/2002 | DeKoning et al. |
| 6,516,312 B1 | 2/2003 | Kraft et al. |
| 6,552,813 B2 | 4/2003 | Yacoub |
| 6,560,609 B1 | 5/2003 | Frey |
| 6,564,377 B1 | 5/2003 | Jayasimha |
| 6,567,935 B1 | 5/2003 | Figueroa |
| 6,578,160 B1 | 6/2003 | MacHardy, Jr. et al. |
| 6,594,684 B1 | 7/2003 | Hodjat et al. |
| 6,597,956 B1 | 7/2003 | Aziz et al. |
| 6,606,602 B1 | 8/2003 | Kolls |
| 6,615,373 B2 | 9/2003 | Elko et al. |
| 6,625,643 B1 | 9/2003 | Colby et al. |
| 6,633,868 B1 | 10/2003 | Min et al. |
| 6,640,241 B1 * | 10/2003 | Ozzie et al. ............. 709/204 |
| 6,647,373 B1 | 11/2003 | Carlton-Foss |
| 6,654,759 B1 | 11/2003 | Brunet et al. |
| 6,654,807 B2 | 11/2003 | Farber et al. |
| 6,671,676 B1 | 12/2003 | Shacham |
| 6,681,251 B1 | 1/2004 | Leymann et al. |
| 6,697,801 B1 | 2/2004 | Eldredge et al. |
| 6,701,342 B1 | 3/2004 | Bartz et al. |
| 6,714,987 B1 | 3/2004 | Amin et al. |
| 6,717,694 B1 | 4/2004 | Fukunaga et al. |
| 6,735,200 B1 | 5/2004 | Novaes |
| 6,738,736 B1 | 5/2004 | Bond |
| 6,748,416 B2 | 6/2004 | Carpenter |
| 6,751,663 B1 | 6/2004 | Farrell et al. |
| 6,799,208 B1 * | 9/2004 | Sankaranarayan et al. ... 709/223 |
| 6,816,905 B1 | 11/2004 | Sheets et al. |
| 6,816,907 B1 | 11/2004 | Mei et al. |
| 6,941,865 B2 | 9/2005 | Kato |
| 6,954,739 B1 | 10/2005 | Bouillet et al. |
| 6,963,285 B2 | 11/2005 | Fischer et al. |
| 7,050,184 B1 | 5/2006 | Miyamoto |
| 7,055,052 B2 | 5/2006 | Chalasani et al. |
| 7,080,077 B2 | 7/2006 | Ramamurthy et al. |
| 7,086,086 B2 | 8/2006 | Ellis |
| 7,093,259 B2 | 8/2006 | Pulsipher et al. |
| 7,096,248 B2 | 8/2006 | Masters et al. |
| 7,123,375 B2 | 10/2006 | Nobutani et al. |
| 7,124,062 B2 | 10/2006 | Gebhart |
| 7,171,654 B2 * | 1/2007 | Werme et al. ............. 717/130 |
| 7,181,302 B2 | 2/2007 | Bayne et al. |
| 7,181,743 B2 | 2/2007 | Werme |
| 7,234,032 B2 | 6/2007 | Durham et al. |
| 7,243,121 B2 | 7/2007 | Neiman et al. |
| 7,243,147 B2 | 7/2007 | Hodges et al. |
| 7,245,584 B2 | 7/2007 | Goringe et al. |
| 7,266,547 B2 | 9/2007 | Bao et al. |
| 7,269,757 B2 | 9/2007 | Lieblich et al. |
| 7,272,732 B2 | 9/2007 | Farkas et al. |
| 7,283,935 B1 | 10/2007 | Pritchard et al. |
| 7,293,092 B2 | 11/2007 | Sukegawa |
| 7,340,654 B2 | 3/2008 | Bigagli et al. |
| 7,406,691 B2 | 7/2008 | Fellenstein et al. |
| 7,426,267 B1 | 9/2008 | Caseau |
| 7,433,931 B2 | 10/2008 | Richoux |
| 7,437,675 B2 | 10/2008 | Casati et al. |
| 7,451,106 B1 | 11/2008 | Gindlesperger |
| 7,464,159 B2 | 12/2008 | Di Luoffo et al. |
| 7,467,196 B2 | 12/2008 | Di Luoffo et al. |
| 7,472,079 B2 | 12/2008 | Fellenstein et al. |
| 7,472,112 B2 | 12/2008 | Pfleiger et al. |
| 7,502,850 B2 | 3/2009 | Fellenstein et al. |
| 7,533,168 B1 | 5/2009 | Pabla et al. |
| 7,533,170 B2 | 5/2009 | Fellenstein et al. |
| 7,552,437 B2 | 6/2009 | Di Luoffo et al. |
| 7,562,035 B2 | 7/2009 | Fellenstein et al. |
| 7,562,143 B2 | 7/2009 | Fellenstein et al. |
| 7,571,120 B2 | 8/2009 | Fellenstein et al. |
| 7,584,274 B2 | 9/2009 | Bond et al. |
| 7,590,623 B2 | 9/2009 | Fellenstein et al. |
| 7,620,706 B2 | 11/2009 | Jackson |
| 7,664,844 B2 | 2/2010 | Di Luoffo et al. |
| 7,668,741 B2 | 2/2010 | Ernest et al. |
| 7,707,288 B2 | 4/2010 | Dawson et al. |
| 7,712,100 B2 | 5/2010 | Fellenstein et al. |
| 7,734,679 B2 | 6/2010 | Di Luoffo et al. |
| 7,739,155 B2 | 6/2010 | Fellenstein et al. |
| 7,743,142 B2 | 6/2010 | Fellenstein et al. |
| 7,761,557 B2 | 7/2010 | Fellenstein et al. |
| 7,788,375 B2 | 8/2010 | Fellenstein et al. |
| 7,793,308 B2 | 9/2010 | Gusler et al. |
| 2002/0023168 A1 | 2/2002 | Bass et al. |
| 2002/0057684 A1 | 5/2002 | Miyamoto et al. |
| 2002/0072974 A1 | 6/2002 | Pugliese et al. |
| 2002/0103904 A1 | 8/2002 | Hay |
| 2002/0116488 A1 | 8/2002 | Subramanian et al. |
| 2002/0147578 A1 | 10/2002 | O'Neil et al. |
| 2002/0152305 A1 | 10/2002 | Jackson et al. |
| 2002/0152310 A1 | 10/2002 | Jain |
| 2002/0165979 A1 | 11/2002 | Vincent |
| 2002/0171864 A1 | 11/2002 | Sesek |
| 2002/0188486 A1 | 12/2002 | Gil et al. |
| 2003/0011809 A1 | 1/2003 | Suzuki et al. |
| 2003/0023499 A1 | 1/2003 | Das et al. |
| 2003/0036886 A1 | 2/2003 | Stone |
| 2003/0041010 A1 | 2/2003 | Yonao-Cowan |
| 2003/0058797 A1 | 3/2003 | Izmailov et al. |
| 2003/0088671 A1 | 5/2003 | Klinker et al. |
| 2003/0101263 A1 | 5/2003 | Bouillet et al. |
| 2003/0105868 A1 | 6/2003 | Kimbrel et al. |
| 2003/0108018 A1 | 6/2003 | Dujardin et al. |
| 2003/0110419 A1 | 6/2003 | Banerjee et al. |
| 2003/0112809 A1 | 6/2003 | Bharali et al. |
| 2003/0115099 A1 | 6/2003 | Stanley et al. |
| 2003/0120701 A1 | 6/2003 | Pulsipher et al. |
| 2003/0126240 A1 | 7/2003 | Vosseler |
| 2003/0126265 A1 | 7/2003 | Aziz et al. |
| 2003/0128186 A1 | 7/2003 | Breslin et al. |
| 2003/0140143 A1 | 7/2003 | Wolf et al. |
| 2003/0145084 A1 | 7/2003 | Mcnerney |
| 2003/0161309 A1 | 8/2003 | Karuppiah |
| 2003/0172061 A1 | 9/2003 | Krupin et al. |
| 2003/0191795 A1 | 10/2003 | Bernardin et al. |
| 2003/0195813 A1 | 10/2003 | Pallister et al. |
| 2003/0200347 A1 | 10/2003 | Weitzman |
| 2003/0204485 A1 | 10/2003 | Triggs |
| 2003/0204758 A1 | 10/2003 | Singh |
| 2003/0212782 A1 | 11/2003 | Canali et al. |
| 2004/0003077 A1 | 1/2004 | Bantz |

| | | | |
|---|---|---|---|
| 2004/0015976 A1 | 1/2004 | Lam |
| 2004/0019624 A1 | 1/2004 | Sukegawa |
| 2004/0059729 A1 | 3/2004 | Krupin et al. |
| 2004/0064548 A1 | 4/2004 | Adams et al. |
| 2004/0078471 A1 | 4/2004 | Yang |
| 2004/0093381 A1 | 5/2004 | Hodges et al. |
| 2004/0095237 A1 | 5/2004 | Chen et al. |
| 2004/0098606 A1 | 5/2004 | Tan et al. |
| 2004/0103339 A1 | 5/2004 | Chalasani et al. |
| 2004/0120256 A1 | 6/2004 | Park |
| 2004/0128186 A1 | 7/2004 | Breslin et al. |
| 2004/0128374 A1 | 7/2004 | Hodges et al. |
| 2004/0145775 A1 | 7/2004 | Kubler et al. |
| 2004/0193461 A1 | 9/2004 | Keohane et al. |
| 2004/0213220 A1 | 10/2004 | Davis |
| 2004/0215590 A1 | 10/2004 | Kroening |
| 2004/0215973 A1 | 10/2004 | Kroening |
| 2004/0225711 A1 | 11/2004 | Burnett et al. |
| 2005/0015437 A1 | 1/2005 | Strait |
| 2005/0021349 A1 | 1/2005 | Chiliotis et al. |
| 2005/0021742 A1 | 1/2005 | Yemini et al. |
| 2005/0027691 A1 | 2/2005 | Brin et al. |
| 2005/0027785 A1 | 2/2005 | Bozak et al. |
| 2005/0041583 A1 | 2/2005 | Su et al. |
| 2005/0044228 A1 | 2/2005 | Birkestrand et al. |
| 2005/0065994 A1 | 3/2005 | Creamer |
| 2005/0071843 A1 | 3/2005 | Guo et al. |
| 2005/0108394 A1 | 5/2005 | Braun |
| 2005/0120160 A1 | 6/2005 | Plouffe et al. |
| 2005/0132041 A1 | 6/2005 | Kundu |
| 2005/0138162 A1 | 6/2005 | Byrnes |
| 2005/0138175 A1 | 6/2005 | Kumar et al. |
| 2005/0149294 A1 | 7/2005 | Gebhart |
| 2005/0160423 A1 | 7/2005 | Bantz et al. |
| 2005/0182838 A1 | 8/2005 | Sheets et al. |
| 2005/0187797 A1 | 8/2005 | Johnson |
| 2005/0187977 A1 | 8/2005 | Frost |
| 2005/0192968 A1 | 9/2005 | Beretich et al. |
| 2005/0234937 A1 | 10/2005 | Ernest et al. |
| 2005/0257079 A1 | 11/2005 | Arcangeli |
| 2005/0283788 A1 | 12/2005 | Bigagli et al. |
| 2006/0047802 A1 | 3/2006 | Iszlai et al. |
| 2006/0064698 A1 | 3/2006 | Miller et al. |
| 2006/0069621 A1 | 3/2006 | Chang et al. |
| 2006/0075041 A1 | 4/2006 | Antonoff et al. |
| 2006/0075042 A1 | 4/2006 | Wang et al. |
| 2006/0149576 A1 | 7/2006 | Ernest et al. |
| 2006/0149652 A1 | 7/2006 | Fellenstein et al. |
| 2006/0288251 A1 | 12/2006 | Jackson |
| 2006/0294218 A1 | 12/2006 | Tanaka et al. |
| 2006/0294238 A1 | 12/2006 | Naik et al. |
| 2007/0022425 A1 | 1/2007 | Jackson |
| 2007/0250489 A1 | 10/2007 | Bao et al. |
| 2008/0168451 A1 | 7/2008 | Challenger et al. |
| 2008/0222025 A1 | 9/2008 | Fellenstein et al. |
| 2008/0256228 A1 | 10/2008 | Fellenstein et al. |
| 2008/0306866 A1 | 12/2008 | Fellenstein et al. |
| 2009/0083425 A1 | 3/2009 | Bozak et al. |
| 2009/0216883 A1 | 8/2009 | Fellenstein et al. |
| 2009/0240547 A1 | 9/2009 | Fellenstein et al. |
| 2009/0259511 A1 | 10/2009 | Fellenstein et al. |
| 2009/0313299 A1 | 12/2009 | Fellenstein et al. |

FOREIGN PATENT DOCUMENTS

| | | |
|---|---|---|
| EP | 0790559 | 8/1997 |
| EP | 1109353 | 6/2001 |
| EP | 1267552 | 12/2002 |
| JP | 08-272638 A | 10/1996 |
| JP | 2000-066904 A | 3/2000 |
| JP | 2000-194572 A | 7/2000 |
| JP | 2002-182932 A | 6/2002 |
| JP | 2003-067199 A | 3/2003 |
| JP | 2003-233515 A | 8/2003 |
| WO | 00/74313 A1 | 7/2000 |
| WO | 03/067494 A1 | 8/2003 |

OTHER PUBLICATIONS

Office Action, U.S. Appl. No. 11/031,542, filed Jan. 6, 2005, Dawson et al, Mailed Jul. 7, 2009, p. 1-15.

Cao et a "Grid Flow: Workflow Management for Grid Computing", Cluster Computing and the Grid, 2003, Proceedings. CCGrid 2003. 3rd IEEE/ACM International Symposium on : Publication Date May 12-15, 2003.

Moore et al, "Managing Mixed Use Clusters with Cluster on Demand", Duke University, Nov. 2002.

Office Action, U.S. Appl. No. 11/031,426, filed Jan. 6, 2005, Carl Philip Gusler et al., Mailed Nov. 13, 2009, 21 pages.

Notice of Allowance, U.S. Appl. No. 11/031,403, filed Jan. 6, 2005, Leslie Mark Ernest et al., Mailed Oct. 5, 2009, 15 pages.

In re Fellenstein, Notice of Allowance, U.S. Appl. No. 12/125,879, filed May 22, 2008, mail date Jan. 29, 2010, 24 pages.

In re Fellenstein, Notice of Allowance, U.S. Appl. No. 11/031,490, filed Jan. 6, 2005, mail date Mar. 9, 2010, 12 pages.

In re Fellenstein, Notice of Allowance, U.S. Appl. No. 12/359,216, filed Jan. 23, 2009, mail date Feb. 1, 2010, 25 pages.

In re Fellenstein, Notice of Allowance, U.S. Appl. No. 12/364,469, filed Feb. 2, 2009, mail date Apr. 14, 2010, 16 pages.

In re Gusler, Office Action, U.S. Appl. No. 11/031,426, filed Jan. 6, 2005, mail date Apr. 29, 2010, 26 pages.

G. Allen et al., "The Cactus Worm: Experiments with Dynamic Resource Discovery and Allocation in a Grid Environment", International Journal of High Performance Computing Applications, vol. 15, No. 4, pp. 345-358.

Japanese Patent Office Action, Information Material for IDS, dated Oct. 27, 2010, 2 pages.

Hai et al, Fault-Tolerant Grid Architecture and Practice, Jul. 2003, vol. 18, pp. 423-433, J Computer Sci and Technology, 11 pages.

Rolia, Jerry et al., Service Centric Computing—Next Generation Internet Computing, 2002, Springer-Verlag Berlin Heidelberg, 17 pages.

Belloum, Adam et al, VLAM-G: a grid based virtual laboratory, 2002, Future Generation Computer Systems 19, Elsevier Science, B.V., 9 pages.

Min, D. and Mutka M., Efficient Job Scheduling in a Mesh Multicomputer Without Discrimination Against Large Jobs, 1995, IEEE, 8 pages.

What's So Great About Grid, Ivan Schneider, Wall Street & Technology, New York, Jul. 2004, p. 24, 4 pages [recovered from Proquest on Sep. 12, 2008], 5 pages.

SGI and Platform Computing Announce Global Alliance for Grid Computing Solutions, PR Newswire, New York, Jul. 16, 2002, [recovered from Proquest on Sep. 12, 2008], 3 pages.

Avellino, G., et al, "The DataGrid Workload Management System: Challenges and Result"s, Journal of Grid Computing, Spinger Netherlands, vol. 2, No. 4, Dec. 2004, 353-367, 15 pages.

Ding et al "An Agent Model for Managing Distributed Software Resources in Grid Environment", 2003, ICCS, LNCS 2685, p. 971-980, 10 pages.

Al-Theneyan, Ahmed Hamdan, "A Policy-Based Resource Brokering Environment for Computations Grids", 2002, Ph.D, dissertation, Old Dominican Unviersity, US—Virginia, 238 pages.

Leff, Avraham, Rayfield, James T., Dias, Daniel M. "Service-Level Agreements and Commercial Grids." IEEE Internet Computing (Jul.-Aug. 2003): pp. 44-50. Discloses monitoring and enforcing SLAs (p. 48-49), 7 pages.

Hill, J R. "A Management platform for commercial Web Services." BT Technology Journal (Jan. 2004): vol. 22 No. 1 pp. 52-62) discloses SLA enforcement in grid environment, 11 pages.

Alexander Keller and Heiko Ludwig, "The WSLA Framework: Specifying and Monitoring Service Level Agreements forWeb Services." Journal of Network and Systems Management, vol. 11, No. 1, Mar. 2003 ( C 2003): p. 57-81, 25 pages.

Menasce, Daniel A., and Casalicchio, Emiliano "QoS in Grid Computing" IEEE Internet Computing (Jul.-Aug. 2004): pp. 85-87, 4 pages.

T Boden, "The grid enterprise—structuring the agile business of the future." BT Technology Journal vol. 22 No. 1 • Jan. 2004: pp. 107-117, 12 pages.

Tcherevik, Dmitri; Managing the Service-Oriented Architecture (SOA) and On-Demand Computing; copyright 2004 Computer Associates International, Inc., pp. 1-11.

Sven Graupner et al., "Management +=Grid", reference numeral HPL 2003-114, copyright Hewlett-Packard Company 2003, pp. 1-2, available at http://www.hpl.hp.com/techreports/2003/HPL-2003-114.html as of Nov. 14, 2004.

Baden, Mr Hughes and Steven, Dr Bird (2003) Grid-Enabling Natural Language Engineering by Stealth. In Proceedings HLT-NAACL03 Workshop on The Software Engineering and Architecture of Language Technology Systems, pp. 31-38, Edmonton, Canada, available from http://eprints.unimelb.edu.au/archive/00000491 as of May 3, 2004.

Zhu et al., "Scheduling Optimization for resource-intensive Web requests on server clusters", ACM Symposium on Parallel Algorithms and Architectures, 1999, p. 13-22.

Rumsewicz et al, "Preferential Load Balancing for Distributed Internet Servers", Cluster Computing and the Grid, Proceedings. First IEEE/ACM International Symposium, May 2001, p. 363-370.

Kim et al., "Request Rate adaptive dispatching architecture for scalable Internet Server", Cluster Computing, 2000, Proceedings. IEEE conference on Nov. 28-Dec. 1, 2000, p. 289-296.

Casalicchio et al, "Scalable Web Clusters with Static and Dynamic Contents", Cluster Computing, 2000, Proceedings. IEEE conference on Nov. 28-Dec. 1, 2000, p. 170-177.

Fox et al, "Cluster-based scalable network services", Oct. 1997 ACM SIGOPS Operating Systems Review, Proceedings of the 16.sup.th ACM symposium on operating systems principles, vol. 31, Issue 5, p. 78-91.

"Foster et al.; The Anatomy of the Grid, Enabling Scalable Virtual Organizations; available at www.globus.org/research/papers/anatomy.pdf as of Nov. 27, 2003, 25 pages."

"Foster et al.; The Physiology of the Grid, An Open Grid Services Architecture for Distributed Systems Integration; available at www.globus/org/research/papers/ogsa.pdf as of Nov. 27, 2003, 31 pages."

"Foster, Ian; What is the Grid? A Three Point Checklist; available at www-fp.mcs.anl.gov/~foster/Articles/WhatIsTheGrid.pdf as of Nov. 27, 2003, 4 pages."

"Ferreira et al.; IBM Redpaper—Globus Toolkit 3.0 Quick Start; available at www.redbooks.ibm.com/redpapers/pdfs/redp369 as of Nov. 27, 2003, 36 pages."

"IBM Grid Computing—What is Grid Computing; available at www-1.ibm.com/grid/about_grid/what_is.shtml as of Nov. 27, 2003, 1 pages."

"Berstis, Viktors; IBM Redpaper—Fundamentals of Grid Computing; available at www.redbooks.ibm.com/redpapers/pdfs/redp3613.pdf as of Nov. 27, 2003, 28 pages."

"Jacob, Bart; IBM Grid Computing—Grid Computing: What are the key components?; available at www-106.ibm.com/developerworks/grid/library/gr-overview/ as of Nov. 27, 2003, 7 pages."

Unger et al.; IBM Grid Computing—A Visual Tour of Open Grid Services Architecture; available at www-106.ibm.com/developerworks/grid/library/gr-visual/ as of Nov. 27, 2003, 9 pages.

Edited by Rajkumar Buyya; Grid Computing Info Centre: Frequently Asked Questions (FAQ); available at http://www.cs_mu.oz.au/~raj/GridInfoware/ gridfaq.html as of Nov. 27, 2003, 3 pages.

Massie ML et al, "The Ganglia Distributed Monitoring System: Design, Implementation, and Experience" Parallel Computing Elsevier Netherlands, vol. 30, No. 7, Jul. 2004, pp. 817-840 24 pages.

Fenglian Xu et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287, 7 pages.

Ian Foster and Carl Kesselman, "Grid2—Blueprint for a New Computing Infrastructure" 2004, Elsevier, San Francisco, CA, chapter 20, Instrumentation and Monitoring, pp. 319-343, 13 pages.

Smallen S et al, "The Inca Test Harness and Reporting Framework" Supercomputing 2004. Proceedings of the ACM/IEEE SC2004 Conference Pittsburgh, PA, Nov. 2004, p. 1-10, 10 pages.

Hwa Min Lee, "A Fault Tolerance Service for QoS in Grid Computing", Lecture Notes in Computer Science, vol. 2659, Aug. 2003, pp. 286-296, 11 pages.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573, 8 pages.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316, 17 pages.

Geyer DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548, 8 pages.

Method of Providing On-Demand-Computing for Server Blades, IP.com Journal, IP.com Inc., West Henrietta, NY, US, Sep. 8, 2003, 1 page.

Kubicek, C, et al., "Dynamic Allocation of Servers to Jobs in a Grid Hosting Environment", BY Technology Journal, vol. 22, No. 3, Jul. 2004, pp. 251-260, 10 pages.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718, 4 pages.

Bodhuin et al, "Using Grid Technologies for Web-enabling Legacy Systems", Research Centre on Software Technology, available at http://www.bauhaus-stuttgart.de/sam/bodhuin.pdf as of at least Jun. 21, 2004.

IBM, "Process and method for IT energy optimization", Research Disclosure, Feb. 2002, pp. 366-367, 2 pages.

Gillmor, Steve, "Ahead of the curve, Grid Will Hunting", InfoWorld; Feb 25, 2002;24, p. 66, 1 page.

U.S. Appl. No. 10/756,134, filed Jan. 13, 2004, US Patent 7,406,691, Fellenstein et al, Notice of Allowance, mailing date Apr. 22, 2008, 12 pages.

U.S. Appl. No. 10/756,134, filed Jan. 13, 2004, US Patent 7406691, Fellenstein et al, Office Action, mailing date Oct. 31, 2007, 17 pages.

U.S. Appl. No. 10/757,270, filed Jan. 14, 2004, US Patent 7,464,159, Di Luoffo et al, Notice of Allowance, mailing date Aug. 4, 2008, 10 pages.

U.S. Appl. No. 10/757,270, filed Jan. 14, 2004, US Patent 7,464,159, Di Luoffo et al, Office Action, mailing date Jan. 24, 2008, 20 pages.

U.S. Appl. No. 10/757,282, filed Jan. 14, 2004, Di Luoffo et al, US Patent 7,552,437, Final Rejection, mailing date Jun. 28, 2008, 27 pages.

U.S. Appl. No. 10/757,282, filed Jan. 14, 2004, Di Luoffo et al, US Patent 7,552,437, Notice of Allowance, mailing date Feb. 24, 2009, 10 pages.

U.S. Appl. No. 10/757,282, filed Jan. 14, 2004, Di Luoffo et al, US Patent 7,552,437, Office Action, mailing date Dec. 26, 2007, 16 pages.

U.S. Appl. No. 10/756,138, filed Jan. 13, 2004, Fellenstein et al, US Patent 7562143, Final Office Action, mailing date Jun. 5, 2008, 31 pages.

U.S. Appl. No. 10/756,138, filed Jan. 13, 2004, Fellenstein et al, US Patent 7562143, Notice of Allowance, mailing date Feb. 6, 2009, 51 pages.

U.S. Appl. No. 10/756,138, filed Jan. 13, 2004, Fellenstein et al, US Patent 7562143, Office Action, mailing date Sep. 27, 2007, 49 pages.

U.S. Appl. No. 11/034,304, filed Jan. 12, 2005, US Patent 7,467,196, Di Luoffo et al, Notice of Allowance, mailing date Jul. 1, 2008, 6 pages.

U.S. Appl. No. 11/034,304, filed Jan. 12, 2005, US Patent 7,467,196, Di Luoffo et al, Office Action, mailing date Nov. 28, 2007, 26 pages.

U.S. Appl. No. 11/031,403, filed Jan. 6, 2005, US Patent 7668741, Ernest et al, Office Action, mailing date Apr. 24, 2009, 28 pages.

U.S. Appl. No. 12/194,989, filed Aug. 20, 2008, Di Luoffo et al, US Patent 7664844, Office Action, mailing date Apr. 16, 2009, 5 pages.

U.S. Appl. No. 11/034,303, filed Jan. 12, 2008, Fellenstein et al, US Patent 7562035, Notice of Allowance, mailing date Mar. 9, 2009, 9 pages.

U.S. Appl. No. 11/034,303, filed Jan. 12, 2008, Fellenstein et al, US Patent 7562035, Office Action, mailing date Sep. 17, 2008, 35 pages.

U.S. Appl. No. 11/034,335, filed Jan. 12, 2005, Fellenstein et al, US Patent 7472079, Notice of Allowance, mailing date Aug. 7, 2008, 7 pages.

U.S. Appl. No. 11/034,335, filed Jan. 12, 2005, Fellenstein et al, US Patent 7472079, Office Action, mailing date Feb. 22, 2008, 29 pages.
U.S. Appl. No. 11/031,490, filed Jan. 6, 2005, US Patent 7761557, Fellenstein et al, Office Action, mailing date May 29, 2010, 66 pages.
U.S. Appl. No. 11/031,541, filed Jan. 6, 2005, US Patent 7533170, Fellenstein et al, Notice of Allowance, mailing date Oct. 31, 2008, 14 pages.
U.S. Appl. No. 11/031,541, filed Jan. 6, 2005, US Patent 7533170, Fellenstein et al, Office Action, mailing date May 20, 2008, 35 pages.
U.S. Appl. No. 11/031,543, filed Jan. 6, 2005, US Patent 7590623, Fellenstein et al, Office Action, mailing date Dec. 7, 2007, 17 pages.
U.S. Appl. No. 11/031,543, filed Jan. 6, 2005, US Patent 7590623, Fellenstein et al, Office Action, mailing date Jan. 27, 2009, 25 pages.
U.S. Appl. No. 11/031,543, filed Jan. 6, 2005, US Patent 7590623, Fellenstein et al, Notice of Allowance, mailing date May 11, 2009, 72 pages.
U.S. Appl. No. 11/031,543, filed Jan. 6, 2005, US Patent 7590623, Fellenstein et al, mailing date Jun. 25, 2007, 41 pages.
U.S. Appl. No. 11/031,543, filed Jan. 6, 2005, US Patent 7590623, Fellenstein et al, Office Action, mailing date Jul. 10, 2008, 45 pages.
U.S. Appl. No. 11/031,403, filed Jan. 6, 2005, US Patent 7668741, Ernest et al, Office Action, mailing date Oct. 24, 2008, 346 pages.
U.S. Appl. No. 11/031,427, filed Jan. 6, 2005, US Patent 7502850, Fellenstein et al, Notice of Allowance, mailing date Oct. 23, 2008, 14 pages.
U.S. Appl. No. 11/031,427, filed Jan. 6, 2005, Fellenstein et al, Office Action, mailing date May 12, 2008, 26 pages.
U.S. Appl. No. 10/865,270, filed Jun. 10, 2004, US Patent 7266547, Bao et al, Notice of Allowance, mailing date May 3, 2007, 9 pages.
U.S. Appl. No. 11/767,502, filed Jun. 23, 2007, US Publication 2007-0250489, Bao et al, Notice of Allowance, mailing date Oct. 22, 2010, 11 pages.
U.S. Appl. No. 11/031,426, filed Jan. 6, 2005, US Patent 7793308, Gusler et al, Notice of Allowance, mailing date Apr. 29, 2010, 26 pages.
U.S. Appl. No. 10/865,270, filed Jun. 10, 2004, US Patent 7266547, Bao et al, Office Action, mailing date Nov. 7, 2006, 20 pages.
U.S. Appl. No. 11/034,305, filed Jan. 12, 2005, US Patent 7571120, Fellenstein et al, Office Action, mailing date Oct. 2, 2008, 33 pages.
U.S. Appl. No. 11/034,305, filed Jan. 12, 2005, US Patent 7571120, Fellenstein et al, Notice of Allowance, mailing date Mar. 24, 2009, 10 pages.
U.S. Appl. No. 12/491,172, filed Jun. 24, 2009, Fellenstein et al, Notice of Allowance, mailing date Jul. 28, 2010, 13 pages.
U.S. Appl. No. 11/031,489, filed Jan. 6, 2005, US Publication 20060149652, Fellenstein et al, Final Office Action, mailing date Nov. 26, 2010, 78 pages.
U.S. Appl. No. 12/491,172, filed Jun. 24, 2009, Fellenstein et al, Notice of Allowance, mailing date Nov. 19, 2010, 29 pages.
U.S. Appl. No. 12/491,172, filed Jun. 24, 2009, Fellenstein et al, Notice of Allowance, mailing date Dec. 21, 2010, 10 pages.
U.S. Appl. No. 12/211,243, filed Sep. 16, 2008, US 7,734,679, Di Luoffo et al, Office Action, mailing date Jun. 12, 2009, 18 pages.
U.S. Appl. No. 12/211,243, filed Sep. 16, 2008, US Patent 7,734,679, Di Luoffo et al, Notice of Allowance, mailing date Dec. 31, 2009, 18 pages.
U.S. Appl. No. 11/031,426, filed Jan. 6, 2005, US Patent 7793308, Gusler et al, Office Action, mailing date Apr. 1, 2009, 42 pages.
In re Fellenstein, USPTO Office Action, U.S. Appl. No. 12/435,370, filed May 4, 2009, mailing date Sep. 1, 2010, 43 pages.
In re Fellenstein, USPTO Notice of Allowance, U.S. Appl. No. 12/491,172, filed Jun. 24, 2009, mailing date Jun. 24, 2009, 17 pages.
In re Fellenstein, USPTO Office Action, U.S. Appl. No. 12/480,939, filed Jun. 9, 2009, mailing date Sep. 9, 2010, 13 pages.
In re Bao, USPTO Office Action, U.S. Appl. No. 11/767,502, filed Jun. 23, 2007, mailing date Jul. 12, 2010, 35 pages.
In re Fellenstein, Office Action, U.S. Appl. No. 12/491,172, filed Jun. 24, 2009, mail date Apr. 6, 2010, 30 pages.
In re Fellenstein, Office Action, U.S. Appl. No. 12/196,287, filed Aug. 22, 2008, mail date Mar. 30, 2010, 24 pages.
In re Fellenstein, Office Action, U.S. Appl. No. 11/031,489, filed Jan. 6, 2005, mail date Apr. 5, 2010, 28 pages.
TTI Cluster Computing Services on Demand, ClusterOnDemand.com, publicly available and archived by Arhive.org on or before Dec. 8, 2004, 4 pages.
In re Vincent Valentino Di Luoffo, Notice of Allowance, U.S. Appl. No. 12/211,243, filed Sep. 16, 2003, mail date Dec. 31, 2009, 18 pages.
In re Fellenstein, Final Office Action, U.S. Appl. No. 11/031,490, filed Jan. 6, 2005, mail date Dec. 28, 2009, 21 pages.
In re Fellenstein, Notice of Allowance, U.S. Appl. No. 12/364,469, filed Feb. 2, 2009, mail date Jan. 5, 2010, 27 pages.
In re Fellenstein, Supplemental Notice of Allowance, U.S. Appl. No. 12/364,469, filed Feb. 2, 2009, mail date Jan. 19, 2010, 7 pages.
In re Fellenstein, Notice of Allowance, U.S. Appl. No. 11/031,542, filed Jan. 6, 2005, mail date Dec. 8, 2009, 35 pages.
In re Fellenstein, Notice of Allowance, U.S. Appl. No. 10/940,452, filed Sep. 14, 2004, mail date Dec. 16, 2009, 28 pages.
"IBM Girds for Grids". McConnell, Chris. Enterprise System Journal, Oct. 2001, 1 page.
"Grid Computing set for big growth". Tanner, John, America's Network, vol. 107, No. 8, May 15, 2003, 6 pages.
Office Action, U.S. Appl. No. 12/125,892, filed May 22, 2008, mailed Aug. 26, 2009.
Office Action, U.S. Appl. No. 12/125,879, filed May 22, 2008, mailed Sep. 15, 2009.
Notice of Allowance, U.S. Appl. No. 12/194,989, filed Aug. 20, 2008, mailed Sep. 30, 2009.
Office Action, U.S. Appl. No. 11/767,502, filed Jun. 23, 2007, Zhendong Bao, Mailed Jun. 25, 2009, p. 1-14.
Weng et al, "A cost-based online scheduling algorithm for job assignment on computational grids", Springer-Verlag Berlin Heidelberg, 2003, pp. 343-351.
Andrade Heidelberg, "Our grid: An approach to easily assemble grids with equitable resource sharing", Springer-Verlag Berlin Heidelberg, 2003, pp. 61-86.
Chase, JS et al, "Dynamic Virtual Clusters in a Grid Site Manager," High Performance Distributed Computing 2003. Proceedings, 12th IEEE International Symposium, Jun. 22-24, 2003, Piscataway, NJ USA, IEEE, pp. 90-100.
Office Action, U.S. Appl. No. 10/940,452, filed Sep. 14, 2004, Craig Fellenstein, Mailed Jun. 23, 2009, p. 1-13.
Final Office Action, U.S. Appl. No. 12/435,370, filed May 4, 2009, Craig Fellenstein, mailing date Mar. 22, 2011, 43 pages.
Fellenstein et al, Notice of Allowance, U.S. Appl. No. 12/480,939, filed Jun. 9, 2009, mailing date Mar. 3, 2011, 55 pages.
Office Action U.S. Appl. No. 12/535,404, filed Aug. 4, 2009, Craig William Fellenstein, mailing date Nov. 2, 2011, 151 pages.
Joseph, Joshy and Fellenstein, Craig, "Grid Computing", IBM Press, Dec. 30, 2003, ISBN-10: 0-13-145660-1, 387 pages in print edition, also available online from. See pp. 43, 48, 61-64, 139-145, and others.

* cited by examiner

MAINTAINING APPLICATION OPERATIONS WITHIN A SUBOPTIMAL GRID ENVIRONMENT

CROSS-REFERENCE TO RELATED APPLICATIONS

The present application is related to the following copending applications:

This application is a continuation of commonly assigned Ser. No. 10/757,282, now U.S. Pat. No. 7,552,437, filed Jan. 14, 2004, which is hereby incorporated herein by reference.

BACKGROUND OF THE INVENTION

1. Technical Field

The present invention relates in general to grid environments and in particular to managing application operation in a grid environment. Still more particularly, the present invention relates to maintaining application operation within a suboptimal grid environment by reconfiguring the application according to an application profile which expresses the operational requirements of an application in a grid environment.

2. Description of the Related Art

Ever since the first connection was made between two computer systems, new ways of transferring data, resources, and other information between two computer systems via a connection continue to develop. In a typical network architecture, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, have led to the development of Grid technologies using open standards for operating a grid environment. Grid environments support the sharing and coordinated use of diverse resources in dynamic, distributed, virtual organizations. A virtual organization is created within a grid environment when a selection of resources from geographically distributed systems operated by different organizations with differing policies and management systems is organized to handle a job request.

An important attribute of a grid environment that distinguishes a grid environment from merely that of another management system is quality of service maintained across multiple diverse sets of resources. A grid environment preferably does more than just provide resources; a grid environment provides resources with a particular level of service including response time, throughput, availability, security, and the co-allocation of multiple resource types to meet complex user demands. In an effort to provide quality of service, however, the issue in a grid environment is how to meet performance requirements when the reality of network systems is that optimal performance is not always available.

First, a reality of network systems is that applications are typically written to execute on specific platforms with specific operational requirements. In particular, the operational requirements of applications are often specified from measurements run under optimal conditions on the particular platform. Thus, application behavior differs extensively when run on a non-native platform or resources. Therefore, when multiple heterogeneous systems are linked together in a grid environment, there is an issue of how to maintain quality of service when applications are executing on non-native platforms. In particular, there is currently no means to express each application's operational requirements for execution in a grid environment where the available resources with which to execute a job may change rapidly over an interval of time.

Further a reality of network systems, is that applications are typically written where modules of the application are written to execute on specific platforms with relatively static resource pools. Thus, when an application written for a relatively static resource pool is encounters suboptimal operating conditions, the entire application shuts down.

Moreover, within a grid environment, applications are just one level of the functionality of a grid architecture. In addition to the application level, multiple levels and types of services are available to be implemented by an application. The same issues for maintaining quality of service for applications apply when these service layers run on multiple heterogeneous platforms within a grid environment.

Therefore, in view of the foregoing, there is a need for a method, system, and program to manage the software layers of functionality within a grid environment and in particular, to change an application or service behavior to maintain quality of service. Thus, there is a need for a method, system, and program to express an application or service's operational requirements for use in a grid environment, such that when suboptimal performance is detected in the grid environment, the operational behavior of an application or service can be reconfigured based on the operational requirements of the application.

SUMMARY OF THE INVENTION

In view of the foregoing, the invention relates is general to grid environments and provides a system and program for managing applications in a grid environment. The invention relates to maintaining application performance within a suboptimal grid environment by reconfiguring the application according to an application profile which expresses the operational requirements of an application in a grid environment.

In one embodiment, a system for maintaining application operations within a suboptimal grid environment includes one or more processors and includes a grid management system, for execution by at least one of the one or more processors. The grid management system receives a plurality of separate jobs from a plurality of client systems over a network. The grid management system manages at least one grid environment resource from a grid environment including a plurality of computing systems each including at least one resource including at least one operating system, at least one processor, at least one file system, at least one database manager, and at least one memory manager and communicatively connected over the network through the grid management system to share each of the at least one resource through a plurality of web services including simple object access protocol, web services description language, and extensible mark-up language interfaces implemented within at least one web service layer atop at least one grid service layer. The grid management system accesses a profile stored as a document type definition of an extensible markup language expression for an application from among a plurality of applications triggered by a particular job from a grid application profiles database specifying a selection of at least one web service from among the plurality of web services and at least one grid service within the grid services layer required by the application. The grid management system queries a plurality of separate business grid management systems to determine which of the separate business grid management systems manages at least one resource node from among a plurality of resource nodes of the grid environment including the at least one resource, wherein the at least one resource node also includes the at least one grid service required for the application in the profile and returns a price for each of the at least one resource node. The grid management system manages distribution of each of the separate jobs to a separate selection of the at least one resource with the particular job submitted to at least one resource node from among a selection of the plurality of resource nodes returning availability to handle the particular job at a selected price. The grid management system submits an application from among a plurality of applications to the at least one resource node, wherein each of the separate jobs requests at least one of the applications. The grid management system monitors a performance status of the at least one resource node running the application according to the profile. The grid management system compares the performance status with an operational requirement specified in a profile for the application for when the application is operating at the at least one resource node. The grid management system, responsive to the performance status not meeting the operational requirement, determines whether there is at least one other resource node from among the resource nodes within the grid environment that meets the operational requirement specified in the profile for the application for when the application is operating at the at least one other resource node. The grid management system, responsive to determining there is the at least one other resource node that meets the operational requirement specified in the profile, relocates the application to the at least one other resource node within the grid environment. The grid management system, responsive to determining there is not the at least one other resource node that meets the operational requirements specified in the profile, determines from the profile at least one module to first shutdown from among a plurality of modules of the application defined in the profile, wherein each of the modules is assigned a separate resource size requirement and a separate priority to be shut down in the profile. The grid management system, responsive to determining from the profile the at least one module to first shutdown, sends an extensible markup language message to the at least one resource node authorizing the at least one resource node to shutdown at least one module, such that the application continues to operate with a portion of the modules when the performance status fails to meet the operational requirement in the profile. The grid management system, responsive to determining there is not the at least one other resource node that meets the operation requirements specified in the profile, determines whether the application can continue to operate without the at least one module. The grid management system, responsive to a determination that the application cannot continue to operate without the at least one module, returns an error message for the application to a particular client system requesting the application from among the client systems. The grid management system, responsive to a determination that the application can continue to operate without the at least one module, determines whether a next module from among the plurality of modules should be identified to be shutdown if the performance status does not meet the operational requirement after shutting down the at least one module.

In another embodiment, a computer program product for maintaining application operations within a suboptimal grid environment includes one or more computer-readable tangible storage devices. The computer program product includes program instructions, stored on at least one of the one or more storage devices, to receive a plurality of separate jobs from a plurality of client systems over a network at a grid management system, where the grid management system manages at least one grid environment resource from a grid environment including a plurality of computing systems each including at least one resource including at least one operating system, at least one processor, at least one file system, at least one database manager, and at least one memory manager and communicatively connected over the network through the grid management system to share each of the at least one resource through a plurality of web services including simple object access protocol, web services description language, and extensible mark-up language interfaces implemented within at least one web service layer atop at least one grid service layer. The computer program product includes program instructions, stored on at least one of the one or more storage devices, to access a profile stored as a document type definition of an extensible markup language expression for an application from among a plurality of applications triggered by a particular job from a grid application profiles database specifying a selection of at least one web service from among the plurality of web services and at least one grid service within the grid services layer required by the application. The computer program product includes program instructions, stored on at least one of the one or more storage devices, to query a plurality of separate business grid management systems to determine which of the separate business grid management systems manages at least one resource node from among a plurality of resource nodes of the rid environment including the at least one resource, wherein the at least one resource node also includes the at least one grid service required for the application in the profile and returns a price for each of the at least one resource node. The computer program product includes program instructions, stored on at least one of the one or more storage devices, to manage distribution of each of the separate jobs to a separate selection of the at least one resource with the particular job submitted to at least one resource node from among a selection of the plurality of resource nodes returning availability to handle the particular job at a selected price. The computer program product includes program instructions, stored on at least one of the one or more storage devices, to submit an application from among a plurality of applications to the at least one resource node, wherein each of the separate jobs requests at least one of the applications. The computer program product includes program instructions, stored on at least one of the one or more storage devices, to monitor a performance status of the at least one resource node running the application according to the profile. The computer program product includes program instructions, stored on at least one of the one or more storage devices, to compare the performance status with an operational requirement specified in a profile for the application for when the application is operating at the at least one resource node. The computer program product includes program instructions, stored on at least one of the one or more storage devices, responsive to the performance status not meeting the operational requirement, to determine whether there is at least one other resource node from among the resource nodes within the grid environment that meets the operational requirement specified in the profile for the application for when the application is operating at the at least one other resource node. The computer program product includes program instructions, stored on at least one of the one or more storage devices, responsive to determining there is the at least one other resource node that meets the operational requirement specified in the profile, to relocate the application to the at least one other resource node within the rid environment. The computer program product includes program instructions, stored on at least one of the one or more storage devices, responsive to determining there is not the at least one other resource node that meets the operational requirements specified in the profile, to determine from the profile at least one module to first shutdown from among a plurality of modules of the application defined in the profile, wherein each of the modules is assigned a separate resource size requirement and a separate priority to be shut down in the profile. The computer program product includes program instructions, stored on at least one of the one or more storage devices, responsive to determining from the profile the at least one module to first shutdown, to send an extensible markup language message to the at least one resource node authorizing the at least one resource node to shutdown at least one module, such that the application continues to operate with a portion of the modules when the performance status fails to meet the operational requirement in the profile. The computer program product includes program instructions, stored on at least one of the one or more storage devices, responsive to determining there is not the at least one other resource node that meets the operation requirements specified in the profile, to determine whether the application can continue to operate without the at least one module. The computer program product includes program instructions, stored on at least one of the one or more storage devices, responsive to a determination that the application cannot continue to operate without the at least one module, to return an error message for the application to a particular client system requesting the application from among the client systems. The computer program product includes program instructions, stored on at least one of the one or more storage devices, responsive to a determination that the application can continue to operate without the at least one module, to determine whether a next module from among the plurality of modules should be identified to be shutdown if the performance status does not meet the operational requirement after shutting down the at least one module.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
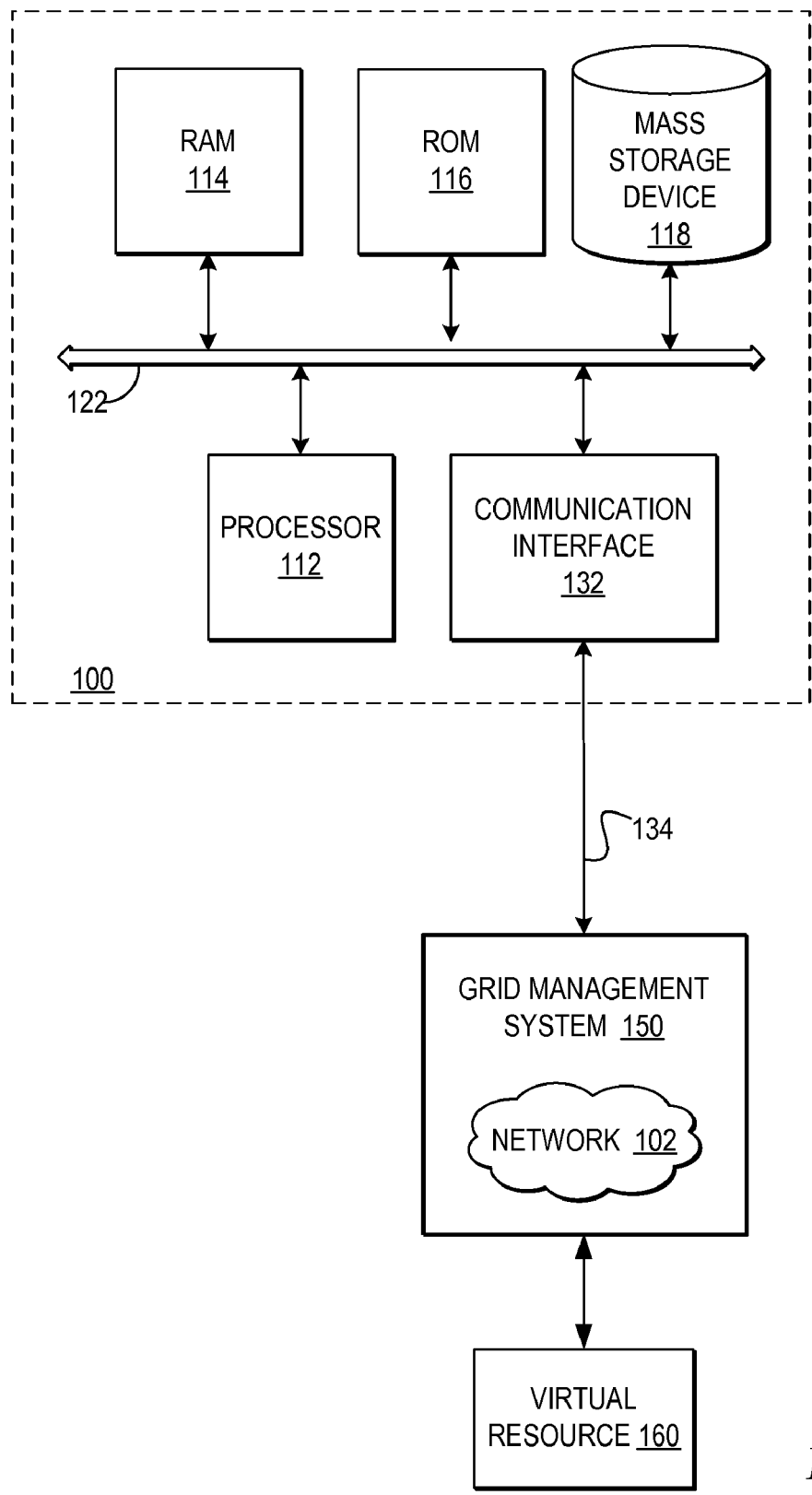
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In a preferred embodiment, application software contains machine executable instructions that when executed on processor 112 carry out the operations depicted in the flowcharts of FIGS. 9A-9B, 10, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein refers to any data storage medium that participates in providing instructions to processor 112 or other components of computer system 100 for execution. Such a data storage medium may take many forms including, but not limited to, non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, or any other memory chip or cartridge, or any other data storage medium from which computer system 100 can read and which is suitable for storing instructions. In the present embodiment, an example of a non-volatile medium is mass storage device 119 which as depicted is an internal component of computer system 100, but will be understood to be provided by an external device. Volatile media include dynamic memory such as RAM 114.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided by a grid management system 150. Grid management system 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
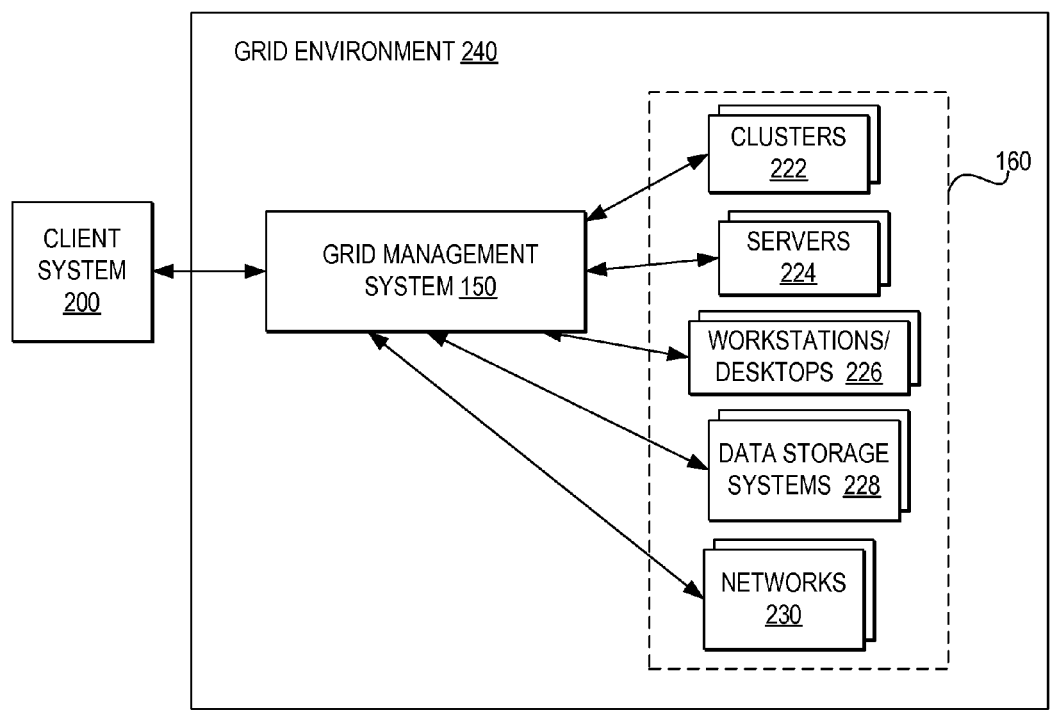
FIG. 2 is block diagram illustrating one embodiment of the general types of components within a grid environment.

With reference now to FIG. 2, a block diagram illustrates one embodiment of the general types of components within a grid environment. In the present example, the components of a grid environment 240 include a client system 200 interfacing with a grid management system 150 which interfaces with server clusters 222, servers 224, workstations and desktops 226, data storage systems 228, and networks 230. For purposes of illustration, the network locations and types of networks connecting the components within grid environment 240 are not depicted. It will be understood, however, that the components within grid environment 240 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 240 are merely representations of the types of components within a grid environment. A grid environment may simply be encompassed in a single computer system or may encompass multiple enterprises of systems.

The central goal of a grid environment, such as grid environment 240 is organization and delivery of resources from multiple discrete systems viewed as virtual resource 160. Client system 200, server clusters 222, servers 224, workstations and desktops 226, data storage systems 228, networks 230 and the systems creating grid management system 150 may be heterogeneous and regionally distributed with independent management systems, but enabled to exchange information, resources, and services through a grid infrastructure enabled by grid management system 150. Further, server clusters 222, servers 224, workstations and desktops 226, data storage systems 228, and networks 230 may be geographically distributed across countries and continents or locally accessible to one another.

In the example, client system 200 interfaces with grid management system 150. Client system 200 may represent any computing system sending requests to grid management system 150. In particular, client system 200 may send job requests and jobs to grid management system 150. Further, while in the present embodiment client system 200 is depicted as accessing grid environment 240 with a request, in alternate embodiments client system 200 may also operate within grid environment 240.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

One function of grid management system 150 is to manage job requests and jobs from client system 200 and control distribution of each job to a selection of computing systems of virtual resource 160 for use of particular resources at the available computing systems within virtual resource 160. From the perspective of client system 200, however, virtual resource 160 handles the request and returns the result without differentiating between which computing system in virtual resource 160 actually performed the request.

To implement grid environment 240, grid management system 150 facilitates grid services. Grid services may be designed according to multiple architectures, including, but not limited to, the Open Grid Services Architecture (OGSA). In particular, grid management system 150 refers to the management environment which creates a grid by linking computing systems into a heterogeneous network environment characterized by sharing of resources through grid services.

Grid environment 240, as managed by grid management system 150, may provide a single type of service or multiple types of services. For example, computational grids, scavenging grids, and data grids are example categorizations of the types of services provided in a grid environment. Computational grids may manage computing resources of high-performance servers. Scavenging grids may scavenge for CPU resources and data storage resources across desktop computer systems. Data grids may manage data storage resources accessible, for example, to multiple organizations or enterprises. It will be understood that a grid environment is not limited to a single type of grid categorization.

Figure 3:
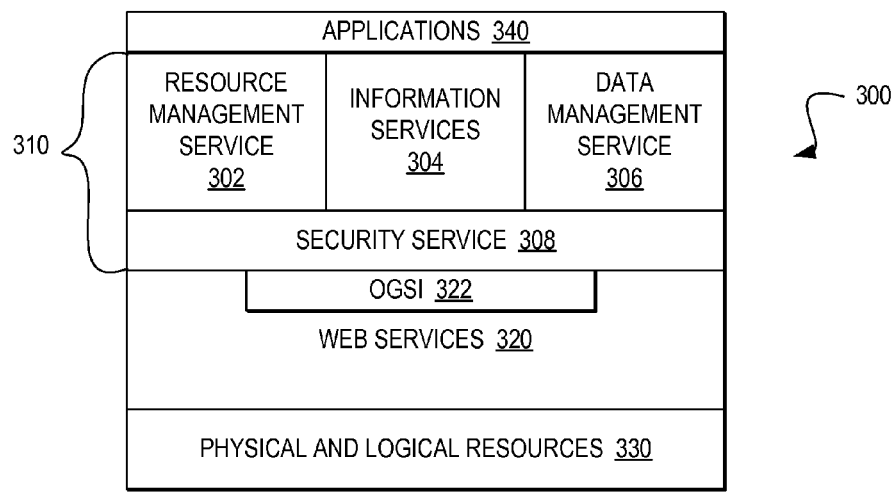
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and eXtensible mark-up language (XML), executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes receiving job requests, scheduling job requests, distributing jobs, and managing the retrieval of the results for jobs. Resource management service 302 preferably monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 preferably manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate. As an example, an application may be available at a web site "www.ibm.com". The web site provides an entry point for the user to send a job request to select from services, such as a catalog search engine or a business to business service. It is important to note that while an application and a grid service are positioned within different layers of the grid architecture 300, a reference to an application in general also encompasses grid services exposed through the application.

Figure 4:
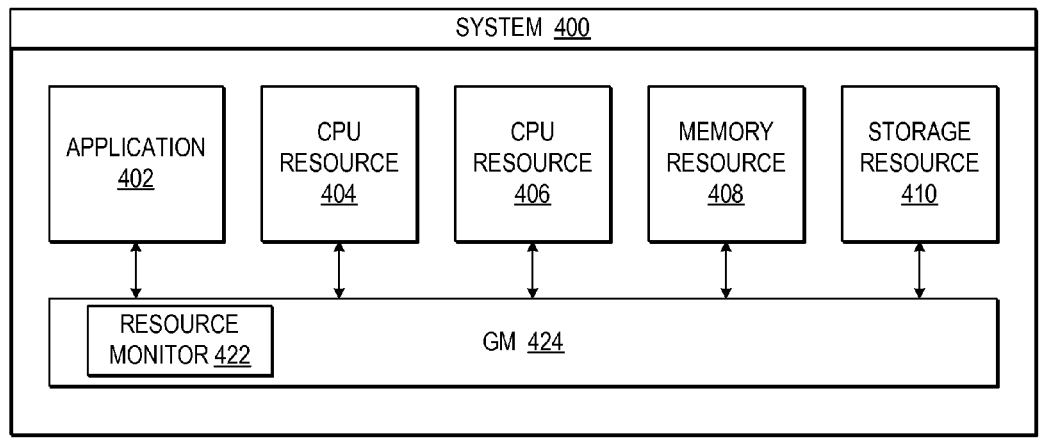
FIG. 4 is a block diagram depicting a system operating within the grid environment from the perspective of the grid management system is depicted in accordance with the method, system, and program of the present invention.

With reference now to FIG. 4, a block diagram of a system operating within the grid environment from the perspective of the grid management system is depicted in accordance with the method, system, and program of the present invention. As illustrated in FIG. 1, a computer system includes many hardware components. As part of a grid environment, however, these hardware components are viewed as resources. For example, a system 400 includes an application resource 402, two CPU resources 404 and 406, a memory resource 408, and a storage resource 410. The resources in system 400 are typical of the types of resources when viewed within the grid environment, however, in an alternate embodiment, other types of resources may be provided. Further, the resources in system 400 may be physically located within a single computer system or distributed across multiple computer systems connected by a network, for example.

As part of the grid management system described in FIG. 2, a grid manager and router (GM) 424 provides the interface between the resources of system 400 and client systems sending requests.

In particular, a resource monitor 422 within GM 424 monitors the working status of each of the resources available in system 400. GM 424 preferably sends status reports to other grid managers and routers within the grid environment to indicate the availability of the resources in system 400. Additionally, status reports may describe the computer hardware, operating system, and resources of system 400. Status reports may be generated, for example, when system 400 joins or leaves the grid environment, when a threshold is detected, at predetermined time intervals, and on specific predetermined events, including, but not limited to a hardware fault or a portion of an application or service failing.

Figure 5:
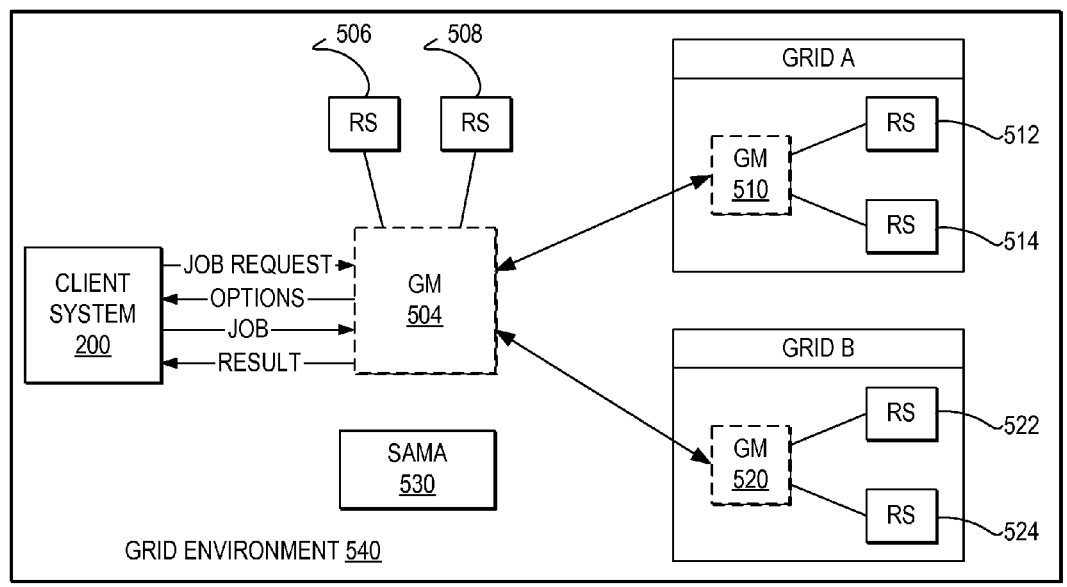
FIG. 5 is an illustrative representation depicting one embodiment of the logical infrastructure of a grid environment in which the present invention may be implemented.

Referring now to FIG. 5, an illustrative representation depicts one embodiment of the logical infrastructure of a grid environment in which the present invention may be implemented. While FIG. 2 depicts an example of general components of a grid environment, in the present figure, an example of how the general components are viewed logically within a grid environment is illustrated in a grid environment 540. In particular, the grid management system functions are logically dispersed into multiple GMs, such as GM 504, GM 510, and GM 520. Further, the virtual resource is logically dispersed into multiple resources (RSs), such as RS 506, RS 508, RS 512, RS 514, RS 522, and RS 524. It is important to note that a resource may not be a direct representation of a physical resource, but rather a logical representation of one or more physical resources and or groups of physical resources.

In the example, client system 200 sends a job request to GM 504. GM 504 searches for resources available to handle the job specified in the job request. In particular, GM 504 checks whether RS 506 and RS 508 can handle the job specified in the job request and may send queries to other GMs, such as GM 510 or GM 520. GMs 510 and 520 return reports on the availability of resources to handle the job request.

In particular, a job request preferably includes a request made through a particular application for a grid service. In general, an application is self-contained, but exposes the grid services layer. The resources necessary to handle the job request are those necessary to handle the request as specified by the application and services accessed.

For purposes of illustrations, RS 506 and RS 508 are considered local resources or resources within the same discrete set of resources to which jobs from client system 200 are submitted. In the examples following, when RS 506 and 508 are not meeting performance requirements for a job from client system 200, then additional resources may be allocated including other resources within the same discrete set of resources, capacity on demand resources, resources from internal grids and finally resources from external grids.

More specifically, in the example, GM 510, RS 512, and RS 514 are part of one grid infrastructure "grid A" operated by a first business that provides a first specified number of grid services for a first specified price. Then, GM 520, RS 522, and RS 524 are part of another grid infrastructure "grid B" operated by a second business that provides a second specified number of grid services for a second specified price. When GM 504 sends the job request to GM 510 and GM 520, the each GM preferably reports whether the job request can be handled and a price for handling the request. In relation to client system 200, grids A and B may be internal grids operating within the same enterprise system as client system 200 or external grids.

After receiving reports on the availability of resources, GM 504 collects the options for handling the job and returns the options to client system 200. Client system 200 may then decide to select a preferred option and send the job to have handled according to the selected option. GM 504 manages the return of the results of the job to client system 200.

The resources utilized in the option selected by client system 200 form a virtual organization for handling the job. For example, if client system 200 selects an option to handle the job based on the option returned from GM 510, then a virtual organization may be formed to process the job which would include GM 504, GM 510, RS 512, and RS 514.

According to an advantage of the present invention, a service availability management agent (SAMA) 530 is preferably accessible within grid environment 540. SAMA performs the functions of monitoring grid resources, policy coordination, application profile management, analytical processing, and problem dispatch for grid environment 540. SAMA 530 may be controlled by dynamic policies that manage its behavior while performing error management. In particular, errors may occur within grid environment 530 when suboptimal conditions occur that degrade applications and services to a minimal operational level or to the point of no service at all. Such suboptimal performance may occur as a result of a system failure, a network infrastructures dropping or becoming overloaded, or other failures that occur within grid environment 540.

In particular, when suboptimal conditions are detected within grid environment 540, SAMA 530 preferably manages use of grid resources to allow applications and services to continue to function. In particular, SAMA 530 may regulate the type and amount of resources provided to an application or service in an attempt keep the application or service running. For example, SAMA 530 may move an application or service to a new set of resource nodes. Additionally, for example, SAMA 530 may reconfigure an application's operation behavior to use less resources.

In particular, SAMA 530 may be incorporated within a single system or distributed across multiple systems. Further, within grid architecture 300 of FIG. 3, SAMA 530 may be implemented in multiple levels. For example, SAMA 530 may be implemented in part as a web service and in part as a resource management service.

It is important to note that while SAMA 530 may manage use of grid resources by both applications and services, for purposes of example, management of grid resources for applications will be described. Further, it will be understood that SAMA 530 may manage use of grid resources by other controllers and agents operating within grid environment 540.

Figure 6:
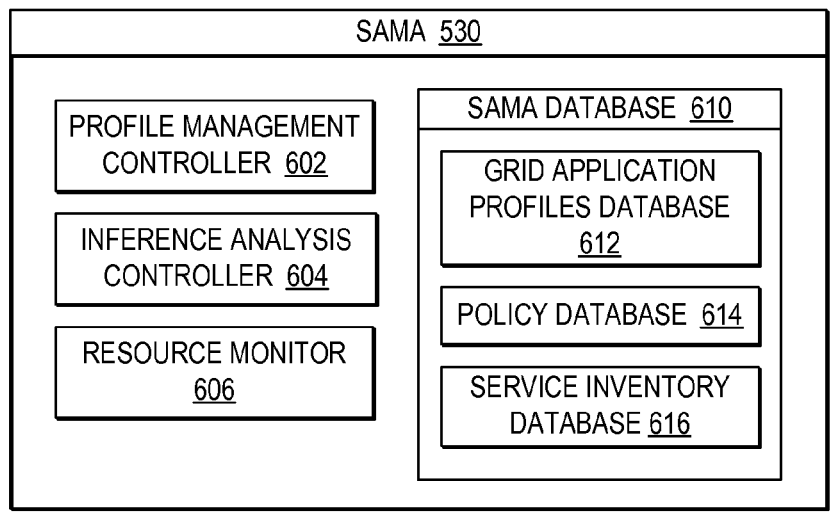
FIG. 6 is a block diagram depicting one embodiment of a SAMA controller in accordance with the method, system, and program of the present invention.

With reference now to FIG. 6, there is a block diagram of one embodiment of a SAMA controller in accordance with the method, system, and program of the present invention. As depicted, SAMA 530 includes multiple controllers and a SAMA database 610.

First, a resource monitor 606 monitors the performance and availability of resources in a grid environment. More specifically, resource monitor 606 may monitor resource usage, capacity, and throughput, for example.

An inference analysis controller 604 preferably receives messages from systems operating in the grid environment and parses the messages to determine the specific request. In particular, a message may include a job request. A job request may invoke a particular service or services published for an application available from the grid. Each application preferably has a profile stored in profiles 612. For purposes of example, grid application profiles database 612 includes Document Type Definitions (DTDs) of an XML expression of the profile of each application. It is important to note that while the examples of the application of profiles to manage resource usage are focused on resource usage by applications, a profile may be specified for all layers of functionality within the grid architecture, including services.

An example schema of an application profile is illustrated in Table 1. In the example, a sample of the types of application attribute information that may be included in a application profile is illustrated. In particular, the name, version, description, developer name, owner name, and code size for an application may be specified. Next, in the example, a sample of the minimal performance and maximum performance requirements of an application are specified for each platform available for operating the application within the grid environment. Further, modules of the application and expected performance based on platforms are included. A module definition may include, for example, the module name, module data, amount of resources required and priority number. A platform definition may include, for example, a name of the platform, version and description of the platform, maximum and minimum memory size, maximum and minimum CPU requirements on a symmetrical multi-processor (SMP) system, maximum and minimum CPU clock speeds, and the operating name and version. In addition, as a security requirement, for any platform on which the application will operate, the application profile may specify a particular type of required platform certificate where the certificate indicates that the platform has under gone some level of assurances by a security standard, such as Common Criteria (CC). It will be understood that while the present example of the application profile is an XML expression, other types of profile expressions may be implemented. It will be understood that the example schema may also applied to services, agents, and other controllers within a grid environment. Further, as will be understood by those with skill in the art, other types of information may be included in an application profile in an implementation of the present invention.

Profile management controller 602 compares the maximum and minimum operating requirements of an application profile to the current operating conditions to determine if the grid is operating at optimal conditions. If the grid is not running at optimal conditions, then profile management controller 602 preferably determines whether the application can be scheduled to run at another resource node or nodes. In particular, profile management controller 602 compares the platform of the additional resource nodes with the platform requirements of the application as specified in the application profile. Further, if additional nodes are not available, then profile management controller 602 determines whether modules of the application can be degraded or shutdown, while still maintaining minimum operating conditions according to the application profile. In particular, profile management controller 602 may process the application profile to determine the modules identified for the application. In one example, each module is assigned a resource size requirement and priority to be pruned or shut down. Profile management controller 602 preferably shuts down modules according to each module's priority and resource size requirements.

Alternatively, a message received at SAMA 530 may include a status request for the availability of the grid environment to handle a job request before a client system sends a job. In particular, a service inventory database 616 maintains the current status of applications and services available from the grid. Service inventory database 616 is preferably updated whenever modules are shutdown, such that responses to status requests are efficiently returned based on the status in service inventory database 616.

Before profile management controller 602 adjusts the use of grid resources, inference analysis controller 604 may compare the application request or monitored suboptimal condition with grid policies in a policy database 614. In particular, a grid policies may specify overall operational requirements for the grid environment. Further, grid policies may specify the type and amount of resources that are available for a particular application when profile management controller 602 is adjusting the use of grid resources.

TABLE 1

```
<?xml version="1.0" encoding="UTF-8"?>
<!--
*************************************************************************
Application Profile DTD - Version 1.0
*************************************************************************
    +:One or more permitted
    *:Zero or more permitted
    ?:Optional
*************************************************************************
-->
<!-- Application Profile Definition -->
<!ELEMENT Application(ApplicationData, AppVital Security+)>
<!-Application attribute information -->
<!ELEMENT ApplicationData >
<!ATTLIST ApplicationData
Name CDATA # REQUIRED
Version CDATA # REQUIRED
Description CDATA #REQUIRED
DeveloperName CDATA #REQUIRED
OwnerName CDATA #REQUIRED
codeSize CDATA #REQUIRED
>
<!ELEMENT AppVital (PruneModule*, Platform+)>
<!ATTLIST AppVital
minimalPerformance CDATA #REQUIRED
maximumPerformance CDATA #REQUIRED
<!- Prune Module Definition -->
<!ELEMENT PruneModlue EMPTY>
<!ATTLIST PruneModule
ModuleName CDATA #REQUIRED
ModuleData CDATA #REQUIRED
ResourceAmt CDATA #REQUIRED
PriorityNumber CDATA #REQUIRED >
<!- Platform supported Definition -->
<!ELEMENT Platform EMPTY>
<!ATTLIST Platform
Name CDATA #REQUIRED
Version CDATA #REQUIRED
Description CDATA # REQUIRED
MaxMemorySize CDATA #REQUIRED
MinMemorySize CDATA #REQUIRED
MaxCPU CDATA #REQUIRED
MinCPU CDATA #REQUIRED
MaxSpeed CDATA #REQUIRED
Min CDATA #REQUIRED
OSName CDATA #REQUIRED
OSVersion CDATA #REQUIRED
evalName CDATA #IMPLIED
evalProvider CDATA #IMPLIED
evalLevel CDATA #IMPLIED
evalDateIssued CDATA #IMPLIED
>
<!- Security Information Definition -->
<!ELEMENT Security EMPTY>
<!ATTLIST Security
keyType (SYMMETRIC|ASYMMETRIC) CDATA # REQUIRED
algorithmName CDATA # REQUIRED
algorithmAttribute CDATA #IMPLIED
keyLength CDATA #REQUIRED
keyIdentifier CDATA #REQUIRED
keyUsage (Authentication|Encryption|Signature) CDATA #REQURED
eExportable (TRUE|FALSE) CDATA #REQUIRED
certificateType (X509V1|X509V3|OTHER) CDATA #IMPLIED
certificateName CDATA #IMPLIED
certificateAttribute CDATA #IMPLIED
cSProviderType (Software|Hardware) CDATA #REQUIRED
ssmName CDATA #IMPLIED
ssmVersion CDATA #IMPLIED
ssmExtName CDATA #IMPLIED
ssmExtVersion CDATA #IMPLIED
hsmName CDATA #IMPLIED
hsmVersion CDATA #IMPLIED
hsmFirmName CDATA #IMPLIED
hsmFirmVersion CDATA #IMPLIED
hsmExtName CDATA #IMPLIED
hsmExtVersion CDATA #IMPLIED
evalName CDATA #IMPLIED
```

TABLE 1-continued

```
evalProvider CDATA #IMPLIED
evalLevel CDATA #IMPLIED
evalDateIssued CDATA #IMPLIED
>
```

Figure 7:
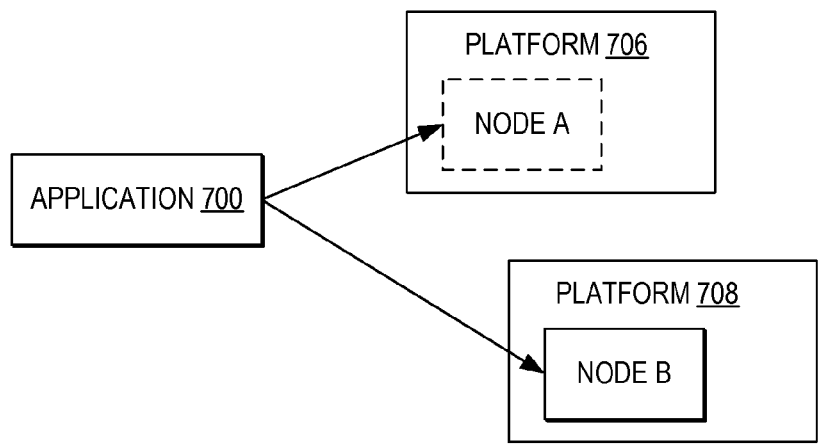
FIG. 7 is a block diagram illustrating one method of adjusting use of resources by rerouting an application in accordance with the method, system, and program of the present invention

With reference now to FIG. 7, there is depicted a block diagram illustrating one method of adjusting use of resources by rerouting an application in accordance with the method, system, and program of the present invention. As depicted, an application 700 is initially run on a resource at node A operating on platform 706. The operational requirements for application 700 to run on platform 706 are preferably defined in a profile for application 700. If the performance of application 700 running on platform 706 is suboptimal according to the profile, then the SAMA may search for other resources available to meet the operational requirements of application 700. In the example, a node B running on platform 708 is available to meet the operational requirements specified for platform 708 by the application profile for application 700. Once a new node is located for application 700, the SAMA may direct a job router to redirect the application from resource node A to node B and begin monitoring the performance of node B. Although the present example is described with reference to an application moving from one node on one platform to another node on another platform, it will be understood that an application may move from one resource node to another within the same platform or may move from one cluster of resource nodes to another cluster of resource nodes.

Figure 8:
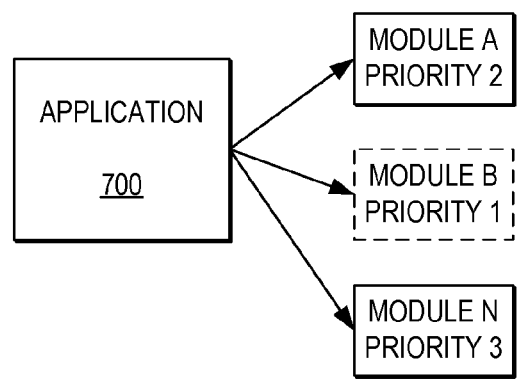
FIG. 8 depicts a block diagram illustrating another method of adjusting use of resources by reconfiguring an application's operational behavior in accordance with the method, system, and program of the present invention.

Referring now to FIG. 8, there is depicted a block diagram illustrating another method of adjusting use of resources by reconfiguring an application's operational behavior in accordance with the method, system, and program of the present invention. As illustrated, application 700 includes multiple independent processing modules A-N. Modules A-N may be handled by a single resource or multiple resources. Further, a single module may be handled across multiple resources, depending on the size of resources required for the module.

In particular, in the profile for application 700, a shutdown priority is preferably specified for each module. In the example, modules A, B and N of application 700 are executing in the grid environment on one or more nodes. The grid environment is only able to provide suboptimal performance for application 700. Thus, the SAMA determines whether modules of application 700 can be shutdown so that portions of application 700 can continue to operate without the entire application shutting down. In the example, module B is assigned the highest shutdown priority. The SAMA may determine that this highest shutdown priority module consumes resources to the extent that the module should be shutdown. The SAMA may send an instruction to the node or nodes running module B to shutdown the module. If the performance remains suboptimal after shutting down module B, the SAMA may send instructions to shutdown additional modules.

Figure 9A:
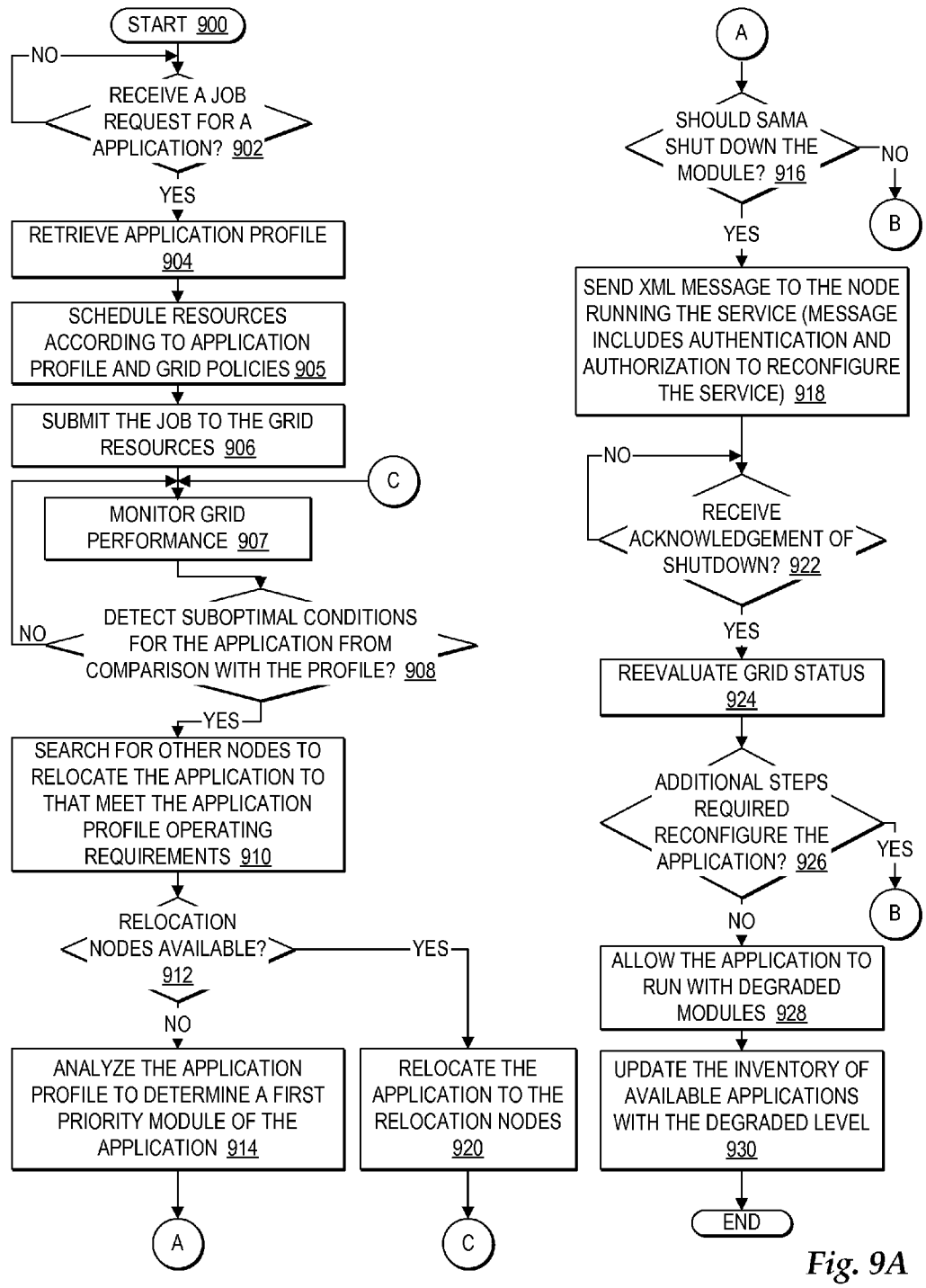
FIGS. 9A-9B depict a high level logic flowchart of a process and program for adjusting the use of grid resources by an application within a grid environment operating at suboptimal conditions.
Figure 9B:
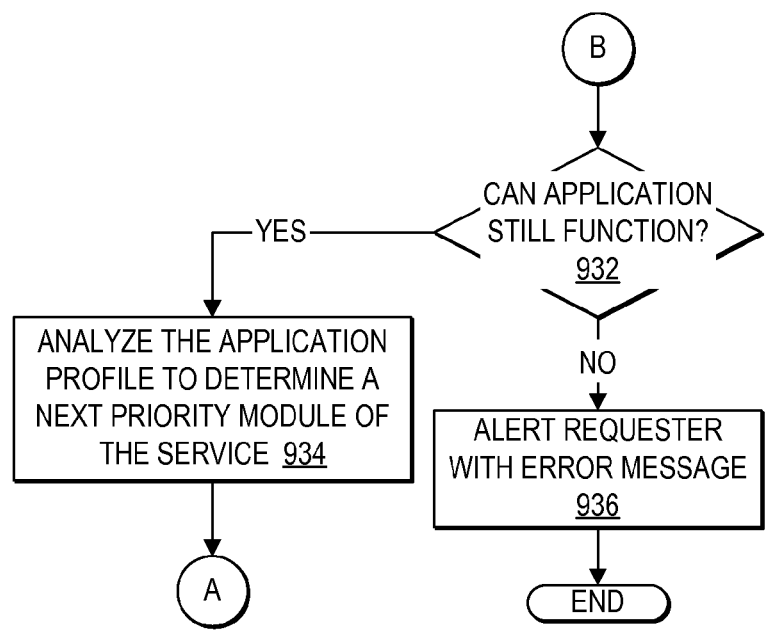

With reference now to FIGS. 9A-9B, there is illustrated a high level logic flowchart of a process and program for adjusting the use of grid resources by an application within a grid environment operating at suboptimal conditions. As illustrated, the process starts at block 900 and thereafter proceeds to block 902. Block 902 depicts a determination whether a job request is received. If a job request is not received, then the process iterates at block 902. If a job request is received, then the process passes to block 904. Block 904 depicts retrieving the application profile of at least one application invoked through the application from which the job request originated. Next, block 905 depicts scheduling resources according to the application profile and grid policies. Thereafter, block 906 depicts submitting the job to the selected grid resources, and the process passes to block 907.

Block 907 illustrates monitoring grid performance of the resources running an application. Thereafter, block 908 depicts a determination whether suboptimal conditions are detected for the application when compared with the application profile. If suboptimal conditions are not detected, then the process returns to block 907. If suboptimal conditions are detected, then the process passes to block 910.

Block 910 depicts searching for other nodes to relocate the application to meet the application operational requirements from the application profile for the particular platform(s) on which the application is executing. Next, block 912 depicts a determination whether relocation nodes are available. This determination may first require determining, based on grid policies, which resources are available for the application. Then, a determination may be made of which of the available resources meet the operational requirements of the application profile as specified for platforms supporting the available resources. If relocation nodes are available, then block 920 depicts relocating the application to the relocation nodes, and the process returns to block 907 while the application is invoked. If relocation nodes are not available, then the process passes to block 914. Block 914 depicts analyzing the application profile to determine a first priority module of the application. Next, block 916 depicts a determination whether SAMA should shut down the module. In particular, SAMA may determine if shutting down the module would free sufficient resources to increase overall performance of the application. Additionally, grid policies and additional application profile information may control whether the SAMA decides to shut down the module. If SAMA should not shut down the module, then the process passes to block 932, to be further described. If SAMA should shut down the module, then the process passes to block 918.

Block 918 depicts sending an XML message to the node running the application where the message includes authentication and authorization to reconfigure the application. It will be understood that other transaction protocols may be implemented. Next, block 922 depicts a determination whether an acknowledgment that the module was shut down is received. If the acknowledgement is not received, the process iterates at block 922 for a period of time. If the acknowledgement is received, then the process passes to block 924. Block 924 depicts reevaluating the grid status based on the resource performance. Next, block 926 depicts a determination whether additional steps are required to reconfigure the application. In particular, the application may need additional reconfiguration if after shutting down one module the application continues to operate under suboptimal conditions. If additional steps are required, then the process passes to block 932, to be further described. If additional steps are not required, then the process passes to block 928. Block 928 depicts allowing the application to run with degraded modules. Next, block 930 depicts updating the inventory of available applications with the degraded level, and the process ends.

As previously references, the process may passes to block 932. Block 932 depicts a determination whether the application can still function under a degraded state. If the application cannot still function, then the process passes to block 936. Block 936 depicts alerting the requester with an error message, and the process ends. Alternatively, if the application can still function, then the process passes to block 934. Block 934 depicts analyzing the application profile to determine a next priority module of the application, and the process passes to block 916.

Figure 10:
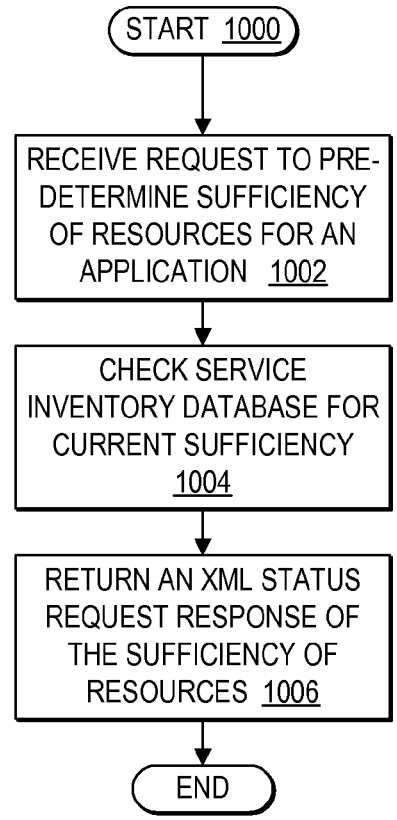
FIG. 10 depicts a high level logic flowchart of a process and program for handling status requests in a grid environment.

Referring now to FIG. 10, there is depicted a high level logic flowchart of a process and program for handling status requests in a grid environment. As illustrated, the process starts at block 1000 and thereafter proceeds to block 1002. Block 1002 depicts receiving a request to pre-determine the sufficiency of the resources for an application. Next, block 1004 depicts checking the service inventory database for current sufficiency of resources. A monitor request may be sent to the potentially effected resources to determine the current availability of resources. Finally, block 1006 depicts returning an XML status request response of the sufficiency of resources, and the process ends.

While the invention has been particularly shown and described with reference to a preferred embodiment, it will be understood by those skilled in the art that various changes in form and detail may be made therein without departing from the spirit and scope of the invention. In particular, it is important to note that while the description of the present invention focuses on the invention operating in the context of grid applications, services, agents, and controllers, the present invention may also apply in the context of normal web services and in distributed architectures in general.

What is claimed is:

1. A system for maintaining application operations within a suboptimal grid environment, the system comprising:

one or more processors;

a grid management system, for execution by at least one of said one or more processors and for receiving a plurality of separate jobs from a plurality of client systems over a network, said grid management system for managing at least one grid environment resource from a grid environment comprising a plurality of computing systems each comprising at least one resource comprising at least one operating system, at least one processor, at least one file system, at least one database manager, and at least one memory manager and communicatively connected over said network through said grid management system to share each said at least one resource through a plurality of web services comprising simple object access protocol, web services description language, and extensible mark-up language interfaces implemented within at least one web service layer atop at least one grid service layer;

said grid management system for accessing a profile stored as a document type definition of an extensible markup language expression for an application from among a plurality of applications triggered by a particular job from a grid application profiles database specifying a selection of at least one web service from among said plurality of web services and at least one grid service within said grid services layer required by said application;

said grid management system for querying a plurality of separate business grid management systems to determine which of said separate business grid management systems manages at least one resource node from among a plurality of resource nodes of said grid environment comprising said at least one resource, wherein said at least one resource node further comprises said at least one grid service required for said application in said profile and returns a price for each said at least one resource node;

said grid management system for managing distribution of each of said plurality of separate jobs to a separate selection of said at least one resource with said particular job submitted to at least one resource node from among a selection of said plurality of resource nodes returning availability to handle said particular job at a selected price;

said grid management system for submitting an application from among a plurality of applications to said at least one resource node, wherein each of said plurality of separate jobs requests at least one of said plurality of applications;

said grid management system for monitoring a performance status of said at least one resource node running said application according to said profile;

said grid management system for comparing said performance status with an operational requirement specified in a profile for said application for when said application is operating at said at least one resource node;

said grid management system, responsive to said performance status not meeting said operational requirement, for determining whether there is at least one other resource node from among said plurality of resource nodes within said grid environment that meets said operational requirement specified in said profile for said application for when said application is operating at said at least one other resource node;

said grid management system, responsive to determining there is said at least one other resource node that meets said operational requirement specified in said profile, for relocating said application to said at least one other resource node within said grid environment;

said grid management system, responsive to determining there is not said at least one other resource node that meets said operational requirements specified in said profile, for determining from said profile at least one module to first shutdown from among a plurality of modules of said application defined in said profile, wherein each of said plurality of modules is assigned a separate resource size requirement and a separate priority to be shut down in said profile;

said grid management system, responsive to determining from said profile said at least one module to first shutdown, for sending an extensible markup language message to said at least one resource node authorizing said at least one resource node to shutdown said at least one module, such that said application continues to operate with a portion of said plurality of modules when said performance status fails to meet said operational requirement in said profile;

said grid management system, responsive to determining there is not said at least one other resource node that meets said operation requirements specified in said profile, for determining whether said application can continue to operate without said at least one module;

said grid management system, responsive to a determination that said application cannot continue to operate without said at least one module, for returning an error message for said application to a particular client system requesting said application from among said plurality of client systems; and said grid management system, responsive to a determination that said application can continue to operate without said at least one module, for determining whether a next module from among said plurality of modules should be identified to be shutdown if said performance status does not meet said operational requirement after shutting down said at least one module.

2. The system according to claim 1 for maintaining application operations within a suboptimal grid environment, wherein said at least one resource node operates on at least one platform for which said operational requirement is specified.

3. The system according to claim 1 for maintaining application operations wherein said application is one from among an stand-alone application, a service, an agent, and a controller operating within said grid environment.

4. A computer program product for maintaining application operations within a suboptimal grid environment, the computer program product comprising:

one or more computer-readable tangible storage devices;

program instructions, stored on at least one of the one or more computer-readable tangible storage devices, to receive a plurality of separate jobs from a plurality of client systems over a network at a grid management system, said grid management system for managing at least one grid environment resource from a grid environment comprising a plurality of computing systems each comprising said at least one resource comprising at least one operating system, at least one processor, at least one file system, at least one database manager, and at least one memory manager and communicatively connected over said network through said grid management system to share each said at least one resource through a plurality of web services comprising simple object access protocol, web services description language, and extensible mark-up language interfaces implemented within at least one web service layer atop at least one grid service layer;

program instructions, stored on at least one of the one or more computer-readable tangible storage devices, to access a profile stored as a document type definition of an extensible markup language expression for an application from among a plurality of applications triggered by a particular job from a grid application profiles database specifying a selection of at least one web service from among said plurality of web services and at least one grid service within said grid services layer required by said application;

program instructions, stored on at least one of the one or more computer-readable tangible storage devices, to query a plurality of separate business grid management systems to determine which of said separate business grid management systems manages at least one resource node from among a plurality of resource nodes of said grid environment comprising said at least one resource, wherein said at least one resource node further comprises said at least one grid service required for said application in said profile and returns a price for each said at least one resource node;

program instructions, stored on at least one of the one or more computer-readable tangible storage devices, to manage distribution of each of said plurality of separate jobs to a separate selection of said at least one resource with said particular job submitted to at least one resource node from among a selection of said plurality of resource nodes returning availability to handle said particular job at a selected price;

program instructions, stored on at least one of the one or more computer-readable tangible storage devices, to submit by said grid management system an application from among a plurality of applications to said at least one resource node, wherein each of said plurality of separate jobs requests at least one of said plurality of applications;

program instructions, stored on at least one of the one or more computer-readable tangible storage devices, to monitor by said grid management system a performance status of said at least one resource node running said application according to said profile;

program instructions, stored on at least one of the one or more computer-readable tangible storage devices, to compare by said grid management system said performance status with an operational requirement specified in a profile for said application for when said application is operating at said at least one resource node;

program instructions, stored on at least one of the one or more computer-readable tangible storage devices, responsive to said performance status not meeting said operational requirement, to determine by said grid management system whether there is at least one other resource node from among said plurality of resource nodes within said grid environment that meets said operational requirement specified in said profile for said application for when said application is operating at said at least one other resource node;

program instructions, stored on at least one of the one or more computer-readable tangible storage devices, responsive to determining there is said at least one other resource node that meets said operational requirement specified in said profile, to relocate by said grid management system said application to said at least one other resource node within said grid environment;

program instructions, stored on at least one of the one or more computer-readable tangible storage devices, responsive to determining there is not said at least one other resource node that meets said operational requirements specified in said profile, to determine by said grid management system from said profile at least one module to first shutdown from among a plurality of modules of said application defined in said profile, wherein each of said plurality of modules is assigned a separate resource size requirement and a separate priority to be shut down in said profile;

program instructions, stored on at least one of the one or more computer-readable tangible storage devices, responsive to determining from said profile said at least one module to first shutdown, to send an extensible markup language message by said grid management system to said at least one resource node authorizing said at least one resource node to shutdown said at least one module, such that said application continues to operate with a portion of said plurality of modules when said performance status fails to meet said operational requirement in said profile;

program instructions, stored on at least one of the one or more computer-readable tangible storage devices, responsive to determining there is not said at least one other resource node that meets said operation requirements specified in said profile, to determine by said grid management system whether said application can continue to operate without said at least one module;

program instructions, stored on at least one of the one or more computer-readable tangible storage devices, responsive to a determination that said application cannot continue to operate without said at least one module, to return by said grid management system an error message for said application to a particular client system requesting said application from among said plurality of client systems; and program instructions, stored on at least one of the one or more computer-readable tangible storage devices, responsive to a determination that said application can continue to operate without said at least one module, to determine by said grid management system whether a next module from among said plurality of modules should be identified to be shutdown if said performance status does not meet said operational requirement after shutting down said at least one module.

* * * * *